Patented Sept. 14, 1948

2,449,233

UNITED STATES PATENT OFFICE 2,449,233

PROCESSES FOR THE PREPARATION OF FLUORINE-CONTAINING CYCLIC HYDROCARBONS

Alexander D. Kischitz, Carl I. Gochenour, and Robert E. Brailsford, Niagara Falls, N. Y., assignors to Hooker Electrochemical Company, Niagara Falls, N. Y., a corporation of New York No Drawing. Application January 8, 1946, Serial No. 639,914

8 Claims. (Cl. 260—648)

Our invention pertains more particularly to a process for the production of fluorine-containing fully halogenated cyclic hydrocarbons having five carbon atoms and one olefinic bond, with a chlorine atom attached to each olefinic carbon, such as tetrafluorotetrachlorocyclopentene, pentafluorotrichlorocyclopentene and hexafluorodichlorocyclopentene.

It is known that these products may be prepared by fluorination of octachlorocyclopentene. However, in this process it is necessary to carry out the fluorination in a pressure vessel, equipped with special valves to facilitate the distillation of the product at substantially the same pressure as that maintained throughout the reaction period. This process involves considerable danger to operating personnel and necessitates the use and frequent replacement of expensive equipment, also the reaction period is prolonged, even at elevated temperatures.

One object of our invention is therefore to effect the production of compounds of the designated class without any of the above described difficulties or dangers. Another object of our invention is to regenerate the fluorinating agent in the reaction mixture as the reaction proceeds.

We have now discovered that these objectives may be accomplished if, instead of fluorinating octachlorocyclopentene, we start with the corresponding fully chlorinated diolefin, namely hexachlorocyclopentadiene, and fluorinate it by means of antimony halide, such as antimony pentafluoride or pentafluorochloride having fluorine available for replacement of chlorine, or by means of antimony fluorides, chlorides or fluorochlorides, in conjunction with chlorine and hydrogen fluoride. In this way the fluorination may be performed at atmospheric pressure, in relatively inexpensive equipment, with reduced danger to the operators, and in a much shorter time than has heretofore been found necessary. The use of an antimony halide as fluorinating agent in conjunction with chlorine and hydrogen fluoride is particularly effective and economical, since it in effect regenerates the fluorinating agent during the course of the reaction.

Hexachlorocyclopentadiene may be produced by reaction of cyclopentadiene with potassium hypochlorite in presence of potassium hydroxide, in a medium of petroleum ether, as described by Fritz Straus in Ber. 63 (1930), pp. 1884. It has the following structure

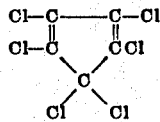

Example I

Three gram mols of antimony pentafluoride were added to one gram mol of hexachlorocyclopentadiene gradually with agitation and refluxing. The reaction being exothermic, the rate of addition was regulated to maintain the refluxing within the capacity of the condenser. After all the antimony pentafluoride had been added, which required about two to five hours, the mixture was caused to reflux for about two hours more by application of external heat. The reaction products were then distilled away from the reaction mixture.

The distillate was washed with dilute HCl, and then with water and a solution of sodium carbonate and filtered. After drying by shaking up with a drying agent, such as sodium carbonate or calcium chloride, the crude product was fractionated and the fraction boiling at 90° C. under atmospheric pressure collected. This was found upon analysis to have a molecular weight and composition corresponding to hexafluorodichlorocyclopentene. The yield of this product was 50 to 55 per cent of the theoretical yield, based on the hexachlorocyclopentadiene, the balance consisting largely of pentafluorotrichloropentene, with smaller quantities of other fluorochlorocyclopentenes, etc.

This reaction is probably as follows:

$$C_5Cl_6 + 3SbF_5 \rightarrow C_5F_6Cl_2 + 2SbF_3Cl_2 + SbF_3 \quad (1)$$

In this case the antimony pentafluoride acts as a reagent.

If preferred, instead of adding the antimony pentafluoride to the hexachlorocyclopentadiene, the hexachlorocyclopentadiene may be added to the antimony pentafluoride in substantially the same manner and proportions as in Example I, with similar results. Other antimony fluorinating agents such as antimony-trifluorodichloride may be employed in the place of antimony pentafluoride.

Example II

Ten pounds of hexachlorocyclopentadiene and eight pounds of antimony pentachloride, proportions which represent a slight molecular excess of the organic material, were placed in a steel reactor fitted with an adequate reflux condenser, an agitator and a gas inlet tube extending to the bottom of the vessel. The material was maintained at a temperature of 50° to 60° C., while gaseous hydrogen fluoride and chlorine were added intermittently through the gas inlet tube, with constant agitation, at a rate of approximately 2 to 3 pounds per hour, in the following amounts: 5 lbs. HF; 3 lbs. Cl₂: 5 lbs. HF; 3 lbs. Cl₂: 4 lbs. HF.

The products were distilled from the reactor, the distillate was washed with hydrochloric acid, then with water, and subsequently treated with an aqueous solution of soda ash to neutralize any acidic components. The product was then dried by shaking with anhydrous calcium chloride, filtered, and carefully fractionated at atmospheric pressure. Two sizeable fractions were recovered, one boiling at 90° C., corresponding to hexafluorodichlorocyclopentene, and the other at approximately 122° C., corresponding to pentafluorotrichlorocyclopentene. The composition of these fractions was confirmed by analysis.

The main reaction in this case is probably as follows:

$$C_5Cl_6 + SbCl_5 + Cl_2 + 9HF \rightarrow$$
$$C_5F_6Cl_2 + SbF_3Cl_2 + 9HCl \quad (2)$$

In this case the antimony pentachloride acts as a catalyst or carrier to transfer the fluorine to the organic molecules. The weight ratio of antimony halide to hexachlorocyclopentadiene is therefore much lower than in Example I.

Example III

Ten pounds of antimony pentachloride were placed in a steel reactor fitted with an adequate reflux condenser, an agitator and a gas inlet tube extending to the bottom of the vessel. The material was maintained at a temperature of 50° to 60° C. while gaseous hydrogen fluoride and chlorine gas were added intermittently through the gas inlet tube, with constant agitation, at a rate of approximately 2 to 3 pounds per hour, in the following amounts: 5 lbs. HF; 3 lbs. Cl₂; 5 lbs. HF; 3 lbs. Cl₂; 4 lbs. HF. Simultaneously fifteen pounds of hexachlorocyclopentadiene were added to the fluorinating agent at a uniform rate so adjusted that all the agents were added to the reaction mixture in substantially the same period of time.

The products were distilled from the reaction mixture. The distillate was washed with hydrochloric acid, then with water, and subsequently treated with an aqueous solution of soda ash to neutralize any acid components. The product was then dried by shaking with anhydrous calcium chloride, filtered and carefully fractionated at atmospheric pressure.

It will be noted that in this case the organic material was added to the fluorinating agent or catalyst, whereas in Example I, the fluorinating agent or catalyst was added to the organic material.

If preferred, instead of introducing the chlorine and hydrogen fluoride separately as in Examples II or III, they may be introduced simultaneously. Other antimony halides such as antimony trifluorodichloride, antimony trifluoride, antimony pentachloride and antimony trichloride may be used with equal facility in this reaction, when conducted as Examples II and III.

In subsequent runs only a small quantity of the antimony salt, approximately 5 to 10% of the original charge, need be added to the reaction, to make up loss of the salt during the distillation of the previous charge. The used salt, after reactivation by the chlorine and hydrogen fluoride, is almost as effective as the fresh salt.

By employing smaller quantities of fluorinating agents, or reacting for a shorter period, the intermediate products, such as pentafluorotrichlorocyclopentene may be prepared in like manner.

The hexafluorodichlorocyclopentene of the examples may be oxidized to hexafluoroglutaric acid, which has the following structural formula:

This product can therefore only have the following symmetrical structure:

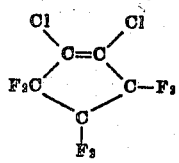

This product has the following physical characteristics:

Appearance _____ Colorless liquid
Boiling point _____ 90° C.
Specific gravity _____ 1.6583
Refractive index _____ 1.36095

The melting point is too low for determination in a bath of solid carbon dioxide and alcohol. It is therefore below −70° C.

The pentafluorotrichlorocyclopentene isolated in Example II has the following properties:

Appearance _____ Water white
Boiling point _____ 121–122° C.
Specific gravity _____ 1.6900
Refractive index _____ 1.400

These fluorochlorocyclopentenes are useful as solvents and plasticizers, also as intermediates in the manufacture of plastic compositions. They are likely to have many other uses at present not fully determined.

It might be thought that in our reaction one of the conjugated double bonds of the starting material was saturated with halogen and the reaction then proceeded in substantially the same manner as in the prior art, in which the starting material is octachlorocyclopropene. However, this hypothesis is untenable because the reaction proceeds much faster and under much milder conditions than that of the prior art, even when using the same fluorinating agents.

It is impossible to fluorinate fully chlorinated cyclic compounds in which all the carbon atoms are in conjugation as for instance hexachlorobenzene, using antimony pentafluoride or other agents of comparable strength; also a fully halogenated cyclic hydrocarbon containing a single olefinic bond has been shown to be practically inert to treatment with antimony pentafluoride. It might be assumed from these facts that fully halogenated cyclic hydrocarbons containing two olefinic linkages would be very difficult, if not impossible, to fluorinate with the ordinary antimony reagents. Our discovery that conjugated double bonds in fully chlorinated cyclic compounds containing at least one dihalogenated carbon atom, can be saturated with fluorine, and a new double bond established between the two, is therefore believed to be new and unpredictable. In the foregoing, the expression "fully halogenated hydrocarbon" is to be understood as meaning one in which all the original hydrogen atoms have been replaced by a halogen.

We claim as our invention:

1. The process for production of fluorochlorocyclopentenes having eight halogen atoms, including a chlorine atom attached to each olefinic carbon, which comprises agitating hexachlorocyclopentadiene with a fluorinating agent of the group consisting of antimony pentafluoride and antimony pentafluorochloride, having available fluorine, in proportions providing at least substantially six atoms of available fluorine per molecule of diolefin, at not less than 40° C., with refluxing, until the reaction has gone as far as practicable with respect to the reagents present, under the stated conditions, and recovering the product from the reaction mixture.

2. The process for production of fluorochlorocyclopentenes having eight halogen atoms, including a chlorine atom attached to each olefinic carbon, which comprises adding hexachlorocyclopentadiene to a fluorinating agent of the group consisting of antimony pentafluoride and antimony pentafluorochloride, having available fluorine by increments, in final proportions providing at least substantially six atoms of available fluorine per molecule of diolefin, at not less than 40° C., with agitation and refluxing, until the reaction has gone as far as practicable with respect to the reagents finally present under the stated conditions, and recovering the product from the reaction mixture.

3. The process for production of fluorochlorocyclopentenes having eight halogen atoms, including a chlorine atom attached to each olefinic carbon, which comprises adding a fluorinating agent of the group consisting of antimony pentafluoride and antimony pentafluorochloride having available fluorine to hexachlorocyclopentadiene, by increments, in final proportions providing at least substantially six atoms of available fluorine per molecule of diolefin, at not less than 40° C., with agitation and refluxing, until the reaction has gone as far as practicable with respect to the reagents finally present, under the stated conditions, and recovering the product from the reaction mixture.

4. The process for production of fluorochlorocyclopentenes having eight halogen atoms, including a chlorine atom attached to each olefinic carbon, which comprises adding antimony pentafluoride to hexachlorocyclopentadiene, by increments, in the final proportions of substantially three molecular equivalents of the fluoride to one of the diolefin at not less than 40° C., with agitation and refluxing, until the reaction has gone as far as practicable under the stated conditions, and recovering the product from the reaction mixture.

5. The process for production of fluorochlorocyclopentenes having eight halogen atoms, including a chlorine atom attached to each olefinic carbon, which comprises adding a fluorinating agent of the group consisting of antimony pentafluoride and antimony pentafluorochloride having available fluorine to hexachlorocyclopentadiene, by increments, in final proportions providing at least substantially six atoms of available fluorine per molecule of diolefin, at not less than 40° C., with agitation and refluxing, continuing the agitation and refluxing, by application of external heat, for a further period, until the reaction has gone as far as practicable with respect to the reagents finally present, under the stated conditions, and recovering the product from the reaction mixture.

6. The process for production of fluorochlorocyclopentenes having eight halogen atoms, including a chlorine atom attached to each olefinic carbon, which comprises agitating hexachlorocyclopentadiene with antimony chloride, in the proportions of substantially ten parts of the diolefin to eight parts of the chloride by weight, and introducing therein gaseous hydrogen fluoride and elemental chlorine, in the final proportions of substantially fourteen parts of hydrogen fluoride and six parts of chlorine by weight, at 40° to 70° C., with continued agitation and refluxing, until the reaction has gone as far as practicable, under the stated conditions, and recovering the product from the reaction mixture.

7. The process for production of fluorochlorocyclopentenes having eight halogen atoms, including a chlorine atom attached to each olefinic carbon, which comprises introducing substantially fourteen parts of gaseous hydrogen fluoride and six parts of elemental chlorine into ten parts of antimony pentachloride by weight, simultaneously adding thereto substantially fifteen parts by weight of hexachlorocyclopentadiene, in the same elapsed period of time, at 40° to 70° C., with agitation and refluxing, until the reaction has gone as far as practicable with respect to the reagents present, under the stated conditions, and recovering the product from the reaction mixture.

8. The process for production of hexafluorodichlorocyclopentene and pentafluorotrichlorocyclopentene which comprises agitating hexachlorocyclopentadiene with a fluorinating agent of the group consisting of antimony pentafluoride and antimony pentafluorochloride, having available fluorine, in proportions providing at least substantially six atoms of available fluorine per molecule of diolefin, at not less than 40° C., with refluxing until the reaction has gone as far as practicable with respect to the diolefin, under the stated conditions, and recovering from the reaction mixture the fractions boiling at substantially 90° C. and 122° C. respectively, under atmospheric pressure.

ALEXANDER D. KISCHITZ.
CARL I. GOCHENOUR.
ROBERT E. BRAILSFORD.

REFERENCES CITED

The following references are of record in the file of this patent:

Henne et al., J. A. C. S., 67, 1235-7 (1945).